(12) United States Patent
Keen

(10) Patent No.: US 11,124,439 B2
(45) Date of Patent: Sep. 21, 2021

(54) DEVICES, SYSTEMS, AND METHODS FOR HETEROGENEOUS CATALYTIC QUENCHING OF HYDROGEN PEROXIDE IN A WATER SOURCE

(71) Applicant: THE UNIVERSITY OF NORTH CAROLINA AT CHARLOTTE, Charlotte, NC (US)

(72) Inventor: Olya Stepanovna Keen, Harrisburg, NC (US)

(73) Assignee: THE UNIVERSITY OF NORTH CAROLINA AT CHARLOTTE, Charlotte, NC (US)

( * ) Notice: Subject to any disclaimer, the term of this patent is extended or adjusted under 35 U.S.C. 154(b) by 17 days.

(21) Appl. No.: 15/781,901

(22) PCT Filed: Dec. 7, 2016

(86) PCT No.: PCT/US2016/065402
§ 371 (c)(1),
(2) Date: Jun. 6, 2018

(87) PCT Pub. No.: WO2017/100335
PCT Pub. Date: Jun. 15, 2017

(65) Prior Publication Data
US 2018/0354832 A1 Dec. 13, 2018

Related U.S. Application Data

(60) Provisional application No. 62/263,960, filed on Dec. 7, 2015.

(51) Int. Cl.
| | | |
|---|---|---|
| *B01J 23/745* | (2006.01) | |
| *C02F 1/70* | (2006.01) | |
| *C02F 1/72* | (2006.01) | |
| *C02F 9/00* | (2006.01) | |
| *C02F 1/32* | (2006.01) | |

(Continued)

(52) U.S. Cl.
CPC ............... *C02F 9/00* (2013.01); *B01J 23/745* (2013.01); *C02F 1/705* (2013.01); *C02F 1/001* (2013.01);
(Continued)

(58) Field of Classification Search
CPC .. C02F 1/001; C02F 1/32; C02F 1/705; C02F 1/722; C02F 1/76; C02F 1/78; C02F 9/00;
(Continued)

(56) References Cited

U.S. PATENT DOCUMENTS

| | | | | |
|---|---|---|---|---|
| 3,562,153 A | * | 2/1971 | Tully et al. ........... | C01B 33/113 210/680 |
| 5,078,798 A | | 1/1992 | Nicholson et al. | |

(Continued)

FOREIGN PATENT DOCUMENTS

WO          1997014657 A1      4/1997

OTHER PUBLICATIONS

"GEH 101" Data Sheet, Lenntech, Inc., (2012), (obtained from lenntech.com Dec. 2019) (Year: 2012).*

(Continued)

*Primary Examiner* — Lucas A Stelling
(74) *Attorney, Agent, or Firm* — J. Clinton Wimbish; Nexsen Pruet, PLLC

(57) ABSTRACT

Devices, systems, and methods for heterogeneous catalytic quenching of hydrogen peroxide ($H_2O_2$) in a water source are disclosed. An exemplary device includes a column containing a catalytic material. The catalytic material can include self-supported granules of Fe(III) oxide. Catalytic reactor systems incorporating the columns and methods of making and using the same are also disclosed.

26 Claims, 8 Drawing Sheets

(51) Int. Cl.
*C02F 1/76* (2006.01)
*C02F 1/78* (2006.01)
*C02F 1/00* (2006.01)

(52) U.S. Cl.
CPC ................ *C02F 1/32* (2013.01); *C02F 1/722* (2013.01); *C02F 1/76* (2013.01); *C02F 1/78* (2013.01); *C02F 2303/04* (2013.01); *C02F 2303/18* (2013.01)

(58) Field of Classification Search
CPC .. C02F 2303/04; C02F 2303/18; B01J 23/745
See application file for complete search history.

(56) References Cited

U.S. PATENT DOCUMENTS

| | | |
|---|---|---|
| 5,220,110 A | 6/1993 | King et al. |
| 2002/0111262 A1 | 8/2002 | Allison |
| 2004/0049091 A1 | 3/2004 | Butler |
| 2006/0111455 A1 | 5/2006 | Klaver et al. |
| 2006/0201882 A1 | 9/2006 | Chen et al. |
| 2007/0170122 A1* | 7/2007 | Tabata ............ C02F 9/00 210/209 |
| 2015/0191379 A1 | 7/2015 | Dournel |
| 2015/0335063 A1 | 11/2015 | Deevi et al. |
| 2017/0239600 A1* | 8/2017 | Chen ............ C02F 1/003 |

OTHER PUBLICATIONS

"GEH 102" Data Sheet, Lenntech, Inc., (2012), (obtained from lenntech.com Dec. 2019) (Year: 2012).*

"GEH 104" Data Sheet, Lenntech, Inc., (2012), (obtained from lenntech.com Dec. 2019) (Year: 2012).*

International Search Report and Written Opinion corresponding to PCT/US2016/065402, dated Mar. 31, 2017, 11 pages.

* cited by examiner

DEVICES, SYSTEMS, AND METHODS FOR HETEROGENEOUS CATALYTIC QUENCHING OF HYDROGEN PEROXIDE IN A WATER SOURCE

CROSS-REFERENCE TO RELATED APPLICATIONS

This application is a U.S. National Phase of PCT/US2016/065402, filed Dec. 7, 2016, which claims priority under 35 U.S.C. § 119(e)(1) to U.S. Provisional Patent Application Ser. No. 62/263,960, which was filed on Dec. 7, 2015, the disclosure of each is hereby incorporated by reference in its entirety.

FIELD

This application generally relates to devices, systems, and methods of treating water and, more particularly, to devices, systems, and methods for heterogeneous catalytic quenching of hydrogen peroxide ($H_2O_2$) in a water source.

BACKGROUND

Hydrogen peroxide ($H_2O_2$) may be introduced into drinking water sources during one or more stages of a water treatment process to decrease the amount of natural or synthetic contaminants contained therein. For example, advanced oxidation processes (AOPs) are frequently used during water treatment to create hydroxyl radicals that oxidize organic matter. However, the residual $H_2O_2$ that remains in the drinking water source after an AOP is problematic, as it provides microorganisms with an oxygen source and promotes biological regrowth in the water. It also interferes with subsequent disinfection.

One method of removing residual $H_2O_2$ includes introducing chlorine ($Cl_2$, usually added as hypochlorite/hypochlorous acid) to the water source, which oxidizes the $H_2O_2$. This is problematic, however, as additional $Cl_2$ then becomes necessary to achieve the targeted residual concentration required for distribution. Determining the correct amount of $Cl_2$ to add to a water source is challenging, as too much $Cl_2$ can lead to customer dissatisfaction (e.g., dissatisfaction with the taste of the water) and/or a health concern, while too little $Cl_2$ may not meet the required guidelines for potable water.

Another method of removing residual $H_2O_2$ includes processing the water through a granular activated carbon (GAC) device or system, which catalytically quenches the $H_2O_2$. Pores inherent to GAC materials are known to become fouled by organic matter over time, and the devices or systems must be periodically reactivated. Reactivation processes are expensive and are typically performed off-site. Oftentimes, only a fraction of the original catalytic activity can be restored.

In view of the foregoing deficiencies, a need exists for improved devices, systems, and methods of removing residual $H_2O_2$ from water, which are reusable, sustainable, and efficient.

SUMMARY

Water treatment devices, systems, and methods for heterogeneous catalytic quenching of hydrogen peroxide ($H_2O_2$) in a water source are disclosed herein. In one aspect, a water treatment device is provided. A water treatment device described herein can comprise a column including an inlet for receiving a water source and a catalytic material disposed in the column. The catalytic material can comprise a plurality of self-supported granules of Fe(III) oxide. Water treatment devices can be incorporated and used in the water treatment systems and/or methods described herein, for example, catalytic reactor systems and related methods. In some embodiments, a water treatment device exhibits an $H_2O_2$ removal efficiency of at least 90 percent. In some embodiments, $H_2O_2$ removal efficiency of the device is from 95-99.9 percent.

In another aspect, a water treatment system for heterogeneous catalytic quenching of $H_2O_2$ in a water source is provided. The system can comprise a catalytic reactor having an inlet and an outlet and at least one bed of catalytic material disposed in the reactor between the inlet and the outlet. The bed of catalytic material can comprise self-supported granules of Fe(III) oxide. The water source can comprise an influent $H_2O_2$ concentration at the inlet and an effluent $H_2O_2$ concentration at the outlet, the effluent $H_2O_2$ concentration can be at least about 90% less than the influent $H_2O_2$ concentration.

In a further aspect, a method for heterogeneous catalytic quenching of $H_2O_2$ in a water source is provided. The method can comprise providing a catalytic reactor and fixing at least one bed of catalytic material in the catalytic reactor. The bed of catalytic material can comprise self-supported granules of Fe(III) oxide. The method comprises flowing the water source through the catalytic reactor and removing at least 90% of the influent $H_2O_2$ concentration from the water source with the one or more beds of Fe(III) oxide.

As persons having skill in the art will appreciate, the devices and systems herein can comprise any suitable size (e.g., length/height, width/diameter, volume, etc.), shape, and/or dimension consistent with the instant objectives. In some embodiments, for example, catalytic devices and apparatus described herein have dimensions suitable for industrial or municipal water treatment applications. In one embodiment, a device described herein comprises a column with a length of about 0.25 meter (m) or more and a diameter of about 0.1 m or more.

The granules used in the devices, systems, and methods herein can form a catalytic bed having a bulk porosity of between about 25-75%. The catalytic bed can further comprise a bulk density of between about 1-5 $g/cm^3$. Non-porous granules comprising Fe(OH)O or $Fe_2O_3$ may be used, which may be spherical or non-spherical (e.g., irregular, angular). The granules can comprise an average particle size or diameter of between about 0.1-30 mm and exhibit individual particle density of between about 0.5-8 $g/cm^3$.

Further, the devices and/or systems set forth herein can treat between about 10-100 L/min of water and have an operable service life of at least 1,000 hours or more. The water being treated may contact and/or reside in the devices and systems set forth herein for at least 30 seconds, 1 minute, 2 minutes, 5 minutes, 10 minutes, or up to about 30 minutes.

These and other embodiments are described in more detail in the detailed description which follows.

DETAILED DESCRIPTION

Figure 1:
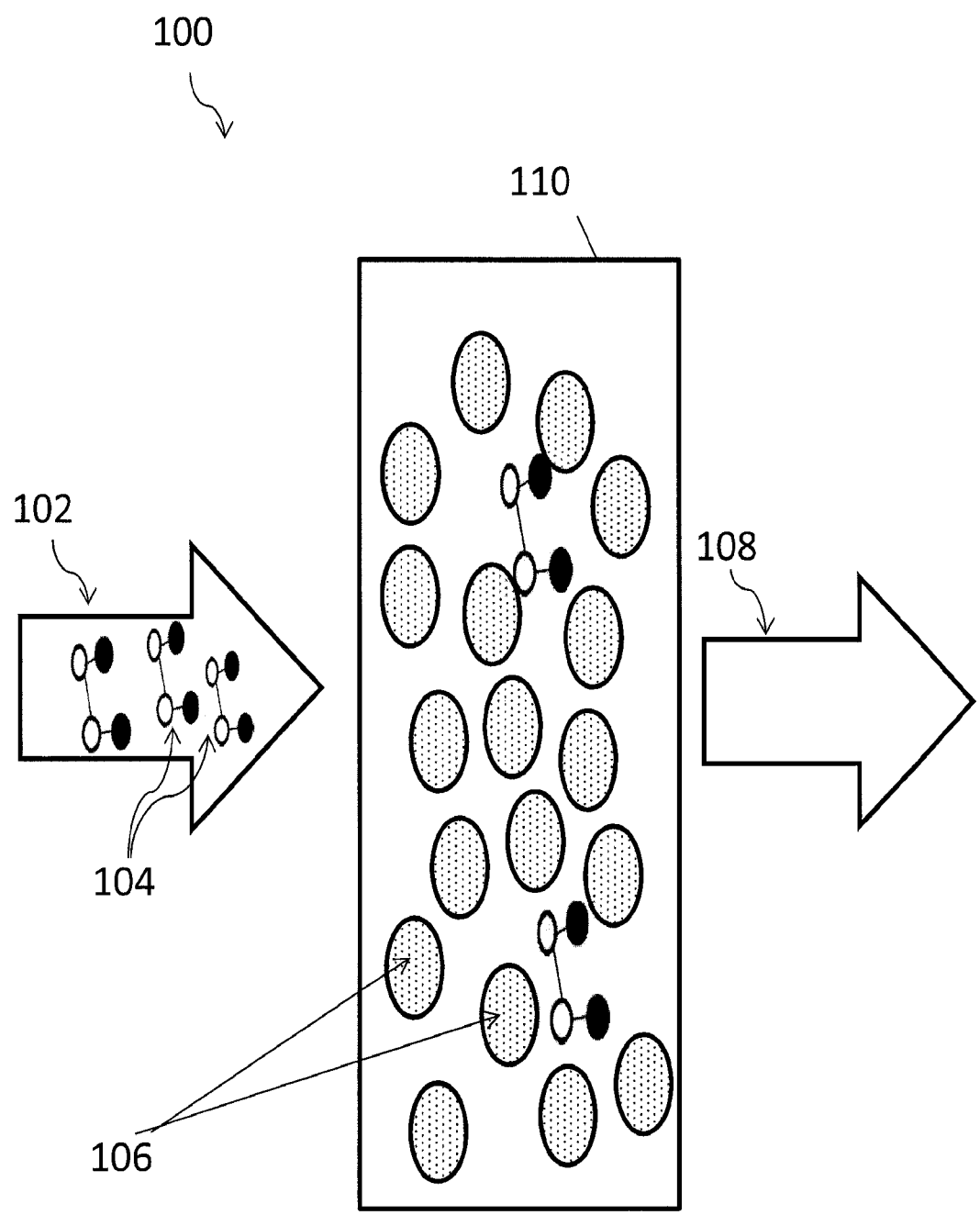
FIG. 1 is a schematic illustration of water treatment device according to some of the embodiments described herein.

Embodiments described herein can be understood more readily by reference to the following detailed description, examples, and figures (i.e., "FIGs."). Various devices, systems, and methods for heterogeneous catalytic quenching of hydrogen peroxide ($H_2O_2$) in a water source described herein, however, such are not limited to the specific embodiments presented in the detailed description, examples, and figures. It should be recognized that these embodiments are merely illustrative of the principles of the present invention. Numerous modifications and adaptations will be readily apparent to those of skill in the art without departing from the disclosed subject matter.

All ranges disclosed herein are to be understood to encompass any and all subranges subsumed therein. For example, a stated range of "1.0 to 10.0" should be considered to include any and all subranges beginning with a minimum value of 1.0 or more and ending with a maximum value of 10.0 or less, e.g., 1.0 to 5.3, or 4.7 to 10.0, or 3.6 to 7.9. Further, all ranges disclosed herein are also to be considered to include the end points of the range, unless expressly stated otherwise. For example, a range of "between 5 and 10" or "5 to 10" or "5-10" should generally be considered to include the end points 5 and 10.

Additionally, in any disclosed embodiment, the terms "substantially," "approximately," and "about" may be substituted with "within [a percentage] of" what is specified, where the percentage includes 0.1, 1, 5, and 10 percent.

The terms "a" and "an" are defined as "one or more" unless this disclosure explicitly requires otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a composition or other object that "comprises," "has," "includes" or "contains" one or more elements possesses those one or more elements, but is not limited to possessing only those elements. Likewise, a method that "comprises," "has," "includes" or "contains" one or more steps possesses those one or more steps, but is not limited to possessing only those one or more steps.

It is further understood that the feature or features of one embodiment may generally be applied to other embodiments, even though not specifically described or illustrated in such other embodiments, unless expressly prohibited by this disclosure or the nature of the relevant embodiments. Likewise, devices, systems, and methods described herein can include any combination of features and/or steps described herein not inconsistent with the objectives of the present disclosure. Numerous modifications and/or adaptations of the devices, systems, and methods described herein will be readily apparent to those skilled in the art without departing from the present subject matter.

A high level (e.g., 5 mg/L or more) of $H_2O_2$ in a source of potable (drinking) water, for example, introduced via advanced oxidation processes (AOPs) or other stage of water treatment, is undesirable and needs to be lowered via $H_2O_2$ removal. Existing devices and systems for removing $H_2O_2$ include decomposing the $H_2O_2$ via catalytic quenching, and utilize porous, organic catalytic materials such as granular activated carbon (GAC). During operation, GAC becomes "fouled" over time and requires reactivation. Reactivation is expensive and typically requires off-site processing via specialty tools and/or energy-extensive techniques. Moreover, after reactivation is complete the catalytic activity of the GAC catalysts is typically only a fraction of its original value, which decreases its ability to effectively remove $H_2O_2$. The surfaces of GAC materials also become oxidized by $H_2O_2$ over time, which leads to a further decrease in the catalytic activity and efficiency thereof.

Notably, in view of the many disadvantages associated with existing catalysts, including GAC, improved devices, systems, and methods for heterogeneous catalytic quenching of $H_2O_2$ in a water source are described herein. Such devices and systems utilize self-supporting, inorganic catalytic materials which exhibit improved reaction rates of quenching $H_2O_2$, thus advantageously improving flow rates and efficiency through a catalytic reactor, while reducing the residence time in the reactor. Additionally, the devices and systems set forth herein obviate the need for extensive reactivation steps and have a longer useful service life than existing materials (e.g., GAC catalysts).

In one aspect, a device for heterogeneous catalytic quenching of $H_2O_2$ in a water source is described herein. A device comprises a column (e.g., a hollow tube, pipe, vessel, etc.) and a catalytic material disposed within (i.e., inside) the column. The catalytic material disposed within the column forms a bed of catalytic material used for treating water in a catalytic reactor, for example, via decomposing or removing $H_2O_2$ from a water source, in some aspects, via catalytic quenching. The column can have any desired dimensions and cross-sectional geometry. In some embodiments, the column has circular or elliptical cross-sectional geometry. Alternatively, the column can have polygonal cross-sectional geometry. The column has an inlet and outlet for passing water through the column. Column size, including inlet and outlet diameter, can be consistent with industrial or municipal water treatment applications and flow requirements.

The catalytic material disposed in the column can comprise self-supported granules of an inorganic catalyst, such as Fe(III) oxide. Unlike organic GAC catalysts, inorganic materials are less susceptible to fouling by organic matter. Thus, reactivation of the catalyst material is obviated. At most, an occasional washing or rinsing of the catalyst material or device may be required to remove any growth or biofilm, however, such washing rinsing can easily be accommodated on-site without significant downtime. As persons having skill in the art will appreciate, more than one device for heterogeneous catalytic quenching of $H_2O_2$ in a water source may be provided in the systems and/or methods described herein. That is, multiple beds of catalytic material (i.e., multiple devices) may be provided in catalytic reactors, where desired.

Turning now to specific components of devices, systems, and methods described herein, the catalytic material comprises and/or is formed from self-supported granules of Fe(III) oxide. The self-supported granules of Fe(III) oxide may be used in a device alone or in combination with one or more additional catalytic materials (e.g., Zn, $Al_2O_3$, activated alumina, $TiO_2$, MgO, GAC, etc.). In some embodiments, the granules of Fe(III) oxide comprise granules of Fe(OH)O, $Fe_2O_3$ and/or derivatives thereof. As used herein, the term "self-supported" and its variants refers to materials that lack a distinct and/or independent catalyst support structure (e.g., a distinct lattice, scaffold, or matrix). That is, the granules of Fe(III) oxide can support themselves. The granules of Fe (III) oxide can comprise any Fe(III) oxide not inconsistent with the objectives of this invention including, for example, Fe(OH)O and $Fe_2O_3$.

Table 1 below identifies exemplary ranges of average particle sizes and/or diameters of inorganic catalyst materials used in devices, systems, and methods described herein.

TABLE 1

| Average Particle Sizes/Diameters in millimeters (mm) |
|---|
| 0.1-30 |
| 0.1-1.0 |
| 0.1-0.6 |
| 0.3-0.6 |
| 0.1-2 |
| 0.3-5 |
| 0.3-10 |
| 0.3-15 |

The self-supported granules of Fe(III) oxide for devices, systems, and methods herein can comprise spherically-shaped particles, non-spherically shaped particles, angular particles, smooth particles, non-angular particles, irregularly shaped particles, or combinations thereof. As Table 1 indicates above, average particle sizes/diameters of the granules of self-supported Fe(III) oxide can measure, for example, between about 0.1 to 30 mm and any subrange therebetween. To avoid channeling in the column and wall effect, the ratio of the diameter of the column, $D_{column}$, to the average particle size (or diameter) of the granules, $d_p$, can satisfy Equation (Eq.) 1:

$$50 \leq \frac{D_{column}}{dp}$$

Smaller particle sizes can increase the surface area available to decompose $H_2O_2$, which improves process efficiency, but may also increase the pumping pressure due to smaller interparticle spacing. Particles with nonspecific morphology (compared to spherical particles, for example) may increase turbulence in the reactor, and thus improve mixing within the interparticle pores.

Further, the granules of self-supported Fe(III) oxide may be non-porous and have a density of between about 0.5 to 8 g/cm³, or any value/subrange therebetween (e.g., about 3.8 g/cm3; about 0.5-4.0 g/cm³, about 1-5 g/cm³, about 2-5 g/cm³, etc.).

In further aspects, water treatment systems for heterogeneous catalytic quenching of $H_2O_2$ in a water source are described herein. Such a system comprises a catalytic reactor having an inlet and an outlet. At least one bed of catalytic material is disposed in the catalytic reactor between the inlet and the outlet. The bed of catalytic material can comprise self-supported granules of Fe(III) oxide as described hereinabove.

In some embodiments, the water source for devices and systems herein comprises an influent $H_2O_2$ concentration at the inlet and an effluent $H_2O_2$ concentration at the outlet. The effluent $H_2O_2$ concentration can measure at least about 90% less than the influent $H_2O_2$ concentration, at least about 95% less than the influent $H_2O_2$ concentration, at least about 98% less than the influent $H_2O_2$ concentration, or at least about 99% less than the influent $H_2O_2$ concentration. The influent $H_2O_2$ concentration can be about 5 mg/L or more. In other embodiments, the influent $H_2O_2$ concentration can be less than 5 mg/L, such as 0.01 mg/L to 4.5 mg/L. In further embodiments, the influent $H_2O_2$ concentration can be about 4 mg/L or more, about 3 mg/L or more, about 2 mg/L or more, about 1 mg/L or more, about 0.1 mg/L or more, etc.). In some embodiments, the effluent $H_2O_2$ concentration can measure between about 90-99.9% less than the influent $H_2O_2$ concentration, or any subrange therebetween. For example, in an exemplary embodiment, the efficiency of a system as described herein is approximately 99.3%, calculated from respective influent/effluent (i.e., entering/exiting) $H_2O_2$ concentrations of 10 mg/L and 0.07 mg/L, respectively.

Further, the bed of catalytic material disposed in a system for heterogeneous catalytic quenching of $H_2O_2$ in a water source comprises a length of about 0.25 meter (m) or more and a diameter of about 0.1 m or more. Tables 2A and 2B below identify ranges of average lengths and/or diameters of columns of catalytic material used in systems, and methods described herein.

TABLE 2A

| Average Column Length (in meters, (m)) |
|---|
| 0.25-5.0 |
| 0.25-0.5 |
| 0.25-1.0 |
| 0.25-5.0 |
| 0.5-1.0 |
| 0.5-2.0 |
| 0.5-5.0 |
| 1.0-5.0 |

TABLE 2B

| Average Column Width/Diameter (in meters, (m)) |
|---|
| 0.1-5.0 |
| 0.1-2.5 |
| 0.1-1.0 |
| 0.1-0.5 |
| 0.5-1.0 |
| 0.5-2.5 |
| 0.5-5.0 |
| 1.0-5.0 |

As described above, the column may exhibit diameter and length consistent with industrial and/or municipal water treatment applications.

As persons having skill in the art will appreciate, the systems and/or methods may incorporate a plurality of columns disposed therein, for example, at least two or more columns, at least three or more columns, between about 1-5 columns, between about 1-10 columns, or between about 1-50 columns for treating water as described herein. As water flows across or through the columns, $H_2O_2$ is quenched therefrom via the catalytic material disposed in the one or more columns. Number of catalytic columns can be selected according to several considerations including, but not limited to, the desired amount of $H_2O_2$ removal, system flow requirements and water flow rates and residence times on the columns.

In some embodiments, the granules of Fe(III) oxide form a bed (e.g., a packed catalyst bed) of catalytic material. The bed of catalytic material may be fixed within a catalytic reactor (i.e., a fixed bed reactor) and comprise a bulk porosity of between about 25-75%. That is, the granules of Fe(III) oxide forming the bed are non-porous, however, pores will exist between adjacent granules in the packed bed. The bed of catalytic material can comprise a bulk density of between about 1-5 g/cm$^3$ or any subrange therebetween. In an exemplary embodiment in which the bed of catalytic material includes a bed porosity of about 50%, the bulk density of the packed bed is approximately 1.9 g/cm$^3$.

Notably, the water treatment devices and systems as described herein, in some embodiments, are operable for at least about 1,000 hours or more without required cleaning or other maintenance. In some embodiments, the water treatment devices and systems as described herein are operable for between about 1,000-20,000 hours, about 1,000-10,000 hours, about 10,000-20,000, or subranges therebetween.

Further, the devices, systems, and/or methods herein include large-scale/high-capacity industrial-sized processing units/reactors designed and configured to treat large volumes of water (defined as liters (L) per minute (min.)), such as large volumes of drinking water. In some embodiments, the devices and systems disclosed herein are configured to treat about 10-200 L/min. of water, and subranges therebetween (e.g., about 10-100 L/min., 20-80 L/min., 20-60 L/min., 50-100 L/min., etc.).

Additionally, the devices and systems described herein utilize inorganic catalytic materials which exhibit faster reaction rates (i.e., about $(1.6 \pm 0.3) \times 10^{-14}$ mol L$^{-1}$ s$^{-1}$ mm$^{-2}$) as compared to GAC. The faster rate advantageously improves the flow rates and efficiency through a catalytic reactor, while also reducing the residence time in the reactor. The residence time of water in a catalytic reactor of the systems described herein is less than about 30 minutes, less than about 20 minutes, less than about 15 minutes, less than about 10 minutes, or less than about 5 minutes. Typical residence time for water within reactor systems described herein is between about 30 seconds and 5 minutes, about 30 seconds and 2 minutes, or about 1-5 minutes.

In certain embodiments, the water treatment systems described herein also include an (optional) AOP reactor in communication (e.g., fluid communication) with the inlet of the catalytic reactor (i.e., upstream of the catalytic reactor). The system can further comprise a (optional) disinfecting unit in communication (e.g., fluid communication) with the outlet of the catalytic reactor. The disinfecting unit can be disposed downstream from the catalytic reactor.

In further aspects, method for making and using devices and systems for heterogeneous catalytic quenching of hydrogen peroxide ($H_2O_2$) in a water source are provided. Such a method comprises providing a catalytic reactor, fixing at least one bed of catalytic material in the catalytic reactor, flowing the water source through the catalytic reactor (i.e., a water source comprising an influent $H_2O_2$ concentration), and removing at least 90% of the influent $H_2O_2$ concentration from the water source. The bed of catalytic material disposed in the system comprises self-supported granules of Fe(III) oxide. Exemplary devices and systems for methods of making and using the same are set forth in the FIGs. and described below.

Referring now to FIG. 1, a water treatment device generally designated 100 is provided. A volume of water is pumped, flowed, or otherwise passed into and through device 100. Influent water 102 contains a concentration of $H_2O_2$ generally designated 104, which is catalytically quenched via device 100. Notably, effluent water 108 contains less $H_2O_2$ than influent water 102. For example, device 100 is configured to remove at least about 90% or more of the original $H_2O_2$ concentration from influent water 102, so that effluent water 108 is devoid or substantially devoid of $H_2O_2$.

Device 100 forms a bed of catalytic material 106. Catalytic material 106 can comprise a plurality of self-supported granules of Fe(III) oxide, including but not limited to Fe(OH)O or Fe$_2$O$_3$. The bed of catalytic material can comprise a bulk porosity (i.e., consisting of pores between granules 106) of between about 25%-75%, for example about 50%, and a bulk density of about 1-5 g/cm$^3$. The granules of Fe(III) oxide are non-porous, and can be spherical or non-spherical. In some embodiments, the granules of Fe(III) oxide comprise an average particle size or diameter of between about 0.3-0.6 mm. However, as persons having skill in the art will appreciate, the particle size may be increased or decreased, as desired, for achieving a given flow rate and efficiency. In some aspects, device 100 comprises a column configured for insertion within a water treatment system, for example, such as a catalytic reactor system. More than one device 100 (column) can be provided and used in systems herein.

In some embodiments, device 100 comprises a housing 110 (e.g., a tube, membrane, etc.) configured to contain a volume of catalytic material 106. Housing 110 can comprise a semipermeable membrane that allows water to pass therethrough while catalytic material 106 disposed therein catalytically decomposes and/or quenches $H_2O_2$ therefrom. Housing 110 can comprise any size, shape, and/or volume. In some embodiments, housing 110 comprises a length of about 1 m and a width/diameter of about 0.5 m. However, as persons having skill in the art will appreciate, the length/width (or diameter) may be increased or decreased, as desired, for achieving a given flow rate and/or efficiency.

Figure 2:
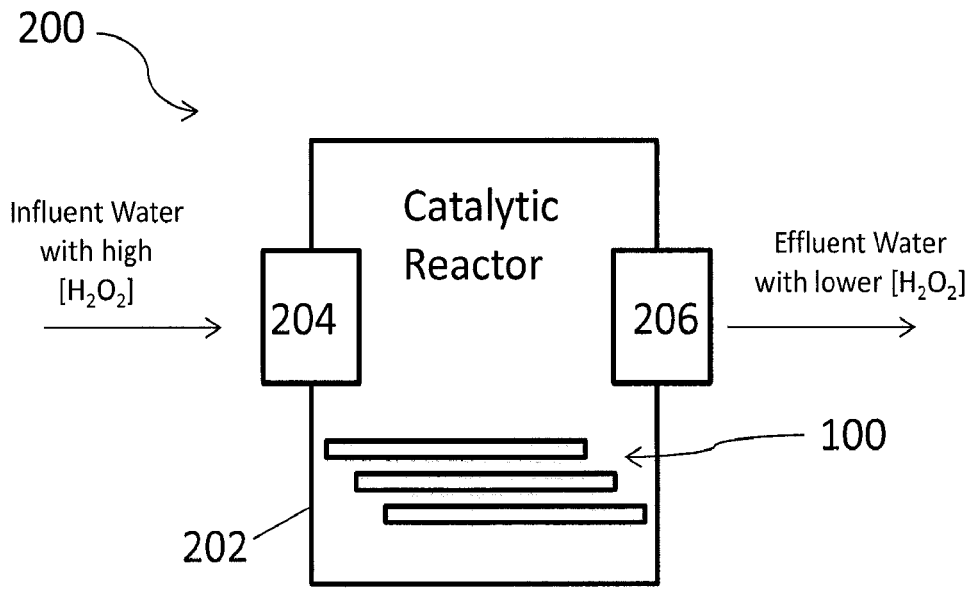
FIGS. 2-4 are schematic illustrations of water treatment devices and/or systems to some embodiments described herein.
Figure 3:
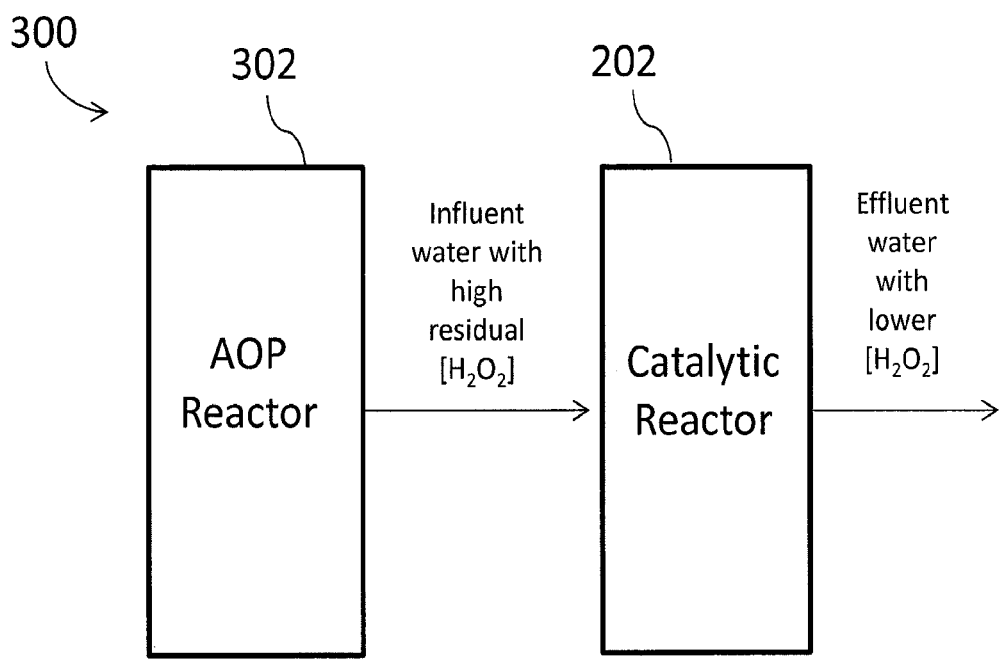
Figure 4:
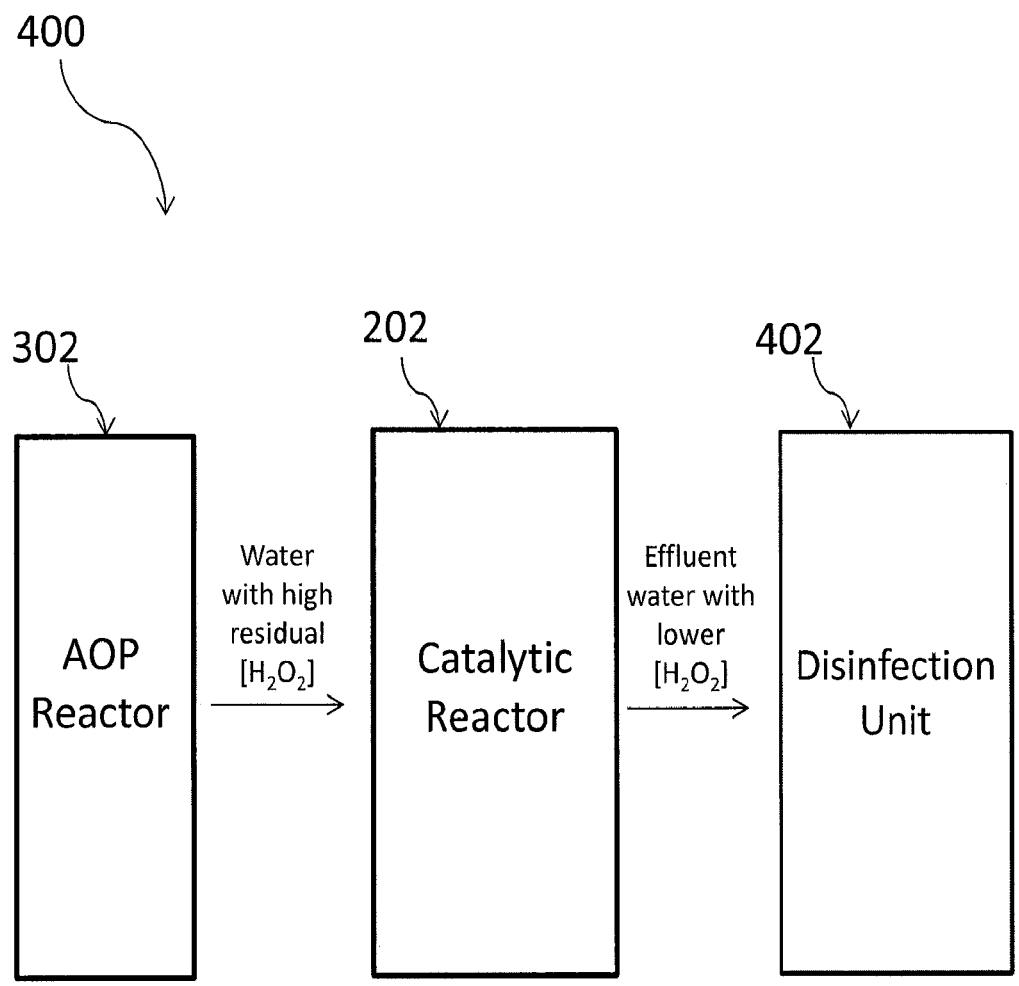

FIGS. 2-4 are schematic illustrations of water treatment devices and/or systems to some embodiments described herein. Referring to FIG. 2, a water treatment system 200 is provided. System 200 comprises a catalytic reactor 202 comprising at least one bed of catalytic material disposed in the reactor between an inlet 204 and outlet 206. One or more devices 100 form respective beds of catalytic material comprising self-supported granules of Fe(III) oxide. A water source is pumped through reactor 202 and $H_2O_2$ is removed from the water source via catalytic quenching. The water source includes an influent $H_2O_2$ concentration at inlet 202 and an effluent $H_2O_2$ concentration at outlet 204. The effluent $H_2O_2$ concentration is at least about 90% less than the influent $H_2O_2$ concentration, and in some embodiments 95% less than the influent $H_2O_2$ concentration, or 98% less than influent $H_2O_2$ concentration. System 200 is operable for at least 1,000 hours or more, and in some embodiments 10,000 hours or more. System 200 can comprise a flow rate of between about 10400 L/min, 20-80 L/min, 30-60 L/min, or subranges therebetween.

FIG. 3 illustrates an embodiment of a system generally designated 300. System 300 comprises an AOP reactor 302 in fluid communication with the inlet of the catalytic reactor 202. AOP reactor 302 treats water with ultraviolet (UV) light and $H_2O_2$ or ozone and $H_2O_2$ to remove natural and/or synthetic contaminants in the water. Water exiting AOP reactor 302 often has a high residual $H_2O_2$ concentration, for example, an $H_2O_2$ concentration of about 5 mg/L or more. The residual $H_2O_2$ is catalytically quenched via reactor 202 prior to distribution to homes, businesses, etc. In this embodiment, at least part of the influent $H_2O_2$ concentration in the water source is derived from AOP reactor 302.

FIG. 4 illustrates a further embodiment of a system generally designated 400. System 400 comprises AOP reactor 302, catalytic reactor 202, and further comprises a disinfection unit 402. In this embodiment, effluent water from the catalytic reactor may be further disinfected via disinfection unit 402 prior to being distributed to end-users for consumption. Disinfection unit 402 can comprise, for example, one or more filters for removing organic or inorganic matter. The water effluent water can also be disinfected via ozone, ultraviolet radiation, or chlorine. Devices, systems, and methods of making and using the same as described herein are more effective and superior to methods using GAC to catalytically quench $H_2O_2$ in a water source.

Notably, the devices and systems herein do not comprise organic catalytic materials and/or materials that must be reactivated. The devices and systems may be washed/rinsed and used for 1,000 hours or more. The influent $H_2O_2$ concentration can be removed, at least in part, by heterogeneous catalytic quenching of the $H_2O_2$ according to the Equation 2:

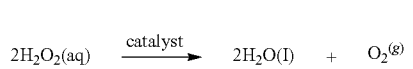

$$2H_2O_2(aq) \xrightarrow{catalyst} 2H_2O(l) + O_2^{(g)} \quad \text{Eq. (2)}$$

Generation of hydroxide radicals may occur if the pH of the water source is low, but is not known to occur if the pH of the water source is near neutral pH, i.e., near pH 7. Notably, the $H_2O_2$ is removed on-contact via the bed of catalytic material, and acceptable empty bed contact times (EBCTs) range from 0.1 to 20 minutes. Empty bed contact time is a measure of the time the water source spends in contact with a bed of catalytic material. Empty bed contact time refers to the "empty" volume of the bed of catalytic material, i.e., the volume of the bed, not excluding volume occupied by the catalytic material, divided by the flow rate of the water flowing through the bed of catalytic material. The flow rate though devices and/or systems herein is about 10-100 L/min, 20-80 L/min, 30-60 L/min, etc.

Some embodiments described herein are further illustrated in the following non-limiting examples.

Example 1

Batch Reactions

Figure 5:
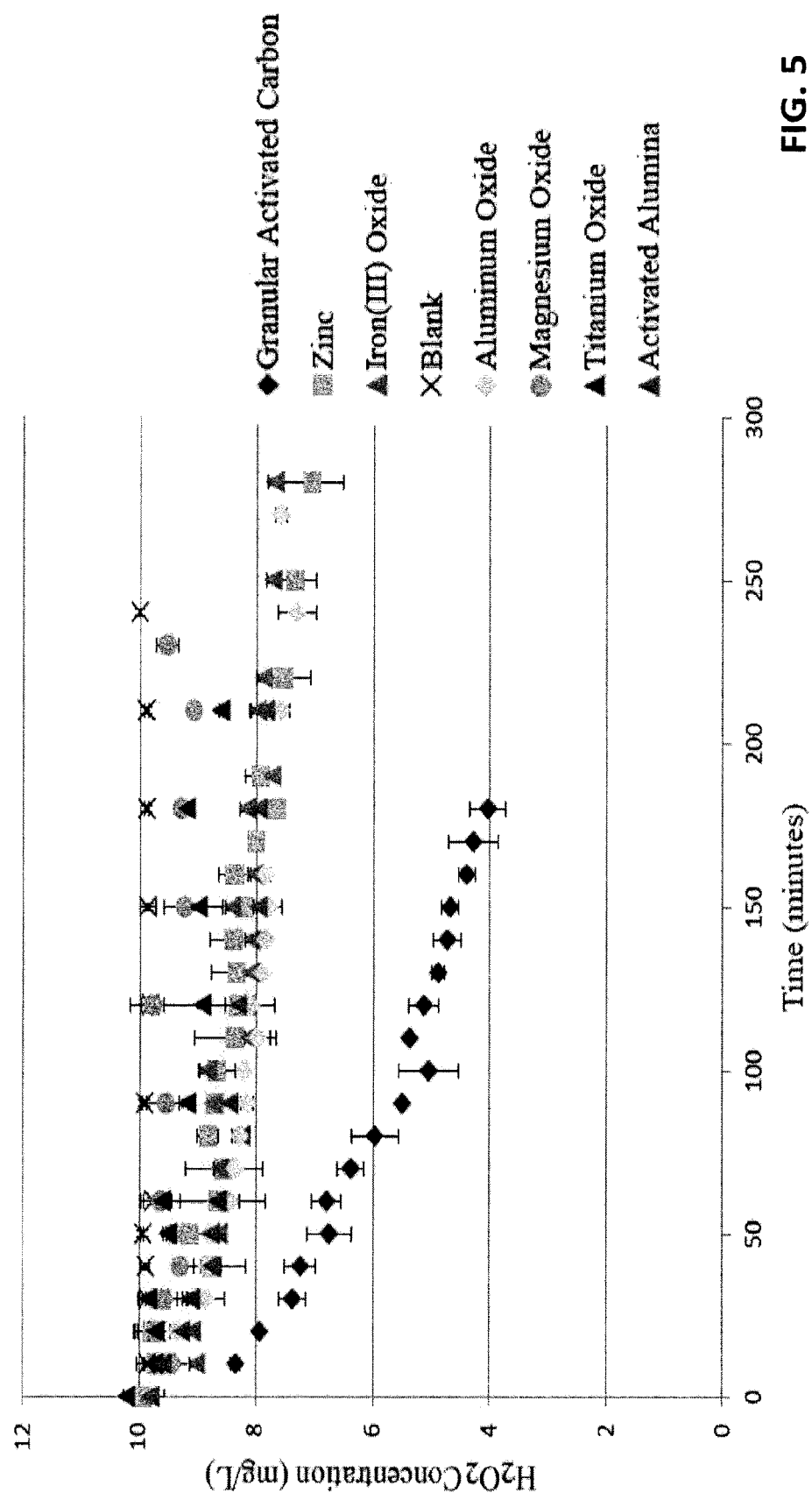
FIG. 5 is a graphical illustration comparing the results of using various catalysts and GAC to catalytically quench hydrogen peroxide ($H_2O_2$) according to some embodiments described herein.

The materials in Table 3 below were identified as inorganic catalysts, possibly as an alternative to GAC. FIG. 5 is a graphical illustration comparing the results of using various catalysts and GAC to catalytically quench hydrogen peroxide ($H_2O_2$) according to some embodiments described herein.

TABLE 3

| Catalyst | Chemical Formula | Vendor | CAS # | Granular Size | Water Solubility* |
|---|---|---|---|---|---|
| Activated Alumina | $Al_2O_3$ | Purewatersite (Sandpoint, ID) | 1333-84-2 | 3.2 mm | Insoluble in water (Sigma-Aldrich 2015) |
| Aluminum Oxide | $Al_2O_3$ | Sigma-Aldrich (St. Louis, MO) | 1344-28-1 | 3 mm | Insoluble in water (Sigma-Aldrich 2015) |
| GAC - DSRA 8X40 | C | Calgon Corporation (Pittsburg, PA) | 7440-44-000 | Sieved 0.6-2 mm | Carbon component insoluble in water (Calgon Carbon 2013) |
| Iron (III) Oxide | Fe(OH)O | Sigma-Aldrich (St. Louis, MO) | 20344-49-4 | 0.3-0.6 mm | Insoluble in water (Acros Organics, 2006) |
| Magnesium Oxide | MgO | Sigma-Aldrich (St. Louis, MO) | 1309-48-4 | 0.3-2 mm | Insoluble in water (Sigma-Aldrich 2015) |
| Silver | Ag | Art-Beads (Gig Harbor, Washington) | 7440-22-4 | 2 mm | Insoluble in water (Teckcominco 2003) |
| Titanium | Ti | Sigma-Aldrich (St. Louis, MO) | 7440-32-6 | 5-10 mm | Insoluble in water (Sigma-Aldrich 2014) |
| Titanium dioxide | $TiO_2$ | Kurt Leseker (Jefferson Hills, PA) | 13463-67-7 | 3-6 mm | Insoluble in water (KurtLesker 2012) |
| Zinc | Zn | Sigma-Aldrich (St Louis, MO) | 7440-66-6 | 6 mm | Insoluble in water (Avantor, 2009) |

*Insoluble if greater than 10,000 mL of solvent is needed to dissolve 1 g of solute (Sigma-Aldrich 2016).

As noted above, devices, systems, and methods herein include inorganic catalytic materials formed from and/or comprising self-supported granules of Fe(III) oxide. Granules are non-porous, insoluble in water, and/or non-hygroscopic.

This inorganic materials used in devices and systems herein are non-hygroscopic and are insoluble in water, which is desirable for meeting EPA drinking water standards, as leaching of the inorganic material into the drinking water source could violate EPA standards. Hygroscopic materials (e.g., $Al_2O_3$) exhibit decreased $H_2O_2$ quenching compared to non-hygroscopic materials. Without being bound by theory, this is believed to be a result of the surface of the material becoming saturated with water molecules, resulting in a barrier between the catalytic active sites of the $Al_2O_3$ surface and the $H_2O_2$ molecules in the solution and preventing quenching from occurring. Finally, non-porous inorganic materials used in devices and systems herein are advantageous as such materials are less likely to grow biofilms that need to be removed. This extends the useful service life of devices and systems incorporating inorganic catalyst materials described herein Batch reactions using each of the inorganic catalysts and GAC in the table above were conducted to determine the reaction rate for the decomposition of $H_2O_2$ of each catalyst. During the decomposition reactions, $H_2O_2$ concentrations were measured. The reactions were carried out in 100 mL amber glass jars with a tin foil lid that prevented any light getting in to avoid photocatalytic quenching of $H_2O_2$ as well as for ease of sampling.

Experiments consisted of 10 grams of catalyst and 100 mL of 10 mg/L $H_2O_2$ initial solution as measured prior to introduction into reactor. GAC granules were sieved between 10 and 30 US standard size sieves, 0.6 mm-2.0 mm, to achieve uniform size due to a large granular size distribution as purchased. The rest of the catalysts were used as purchased and the grain sizes are listed in Table 3. The catalysts were weighed to 10 grams using a SI-114 Denver Instrument analytical balance (Bohemia, N.Y.) and placed into batch reactors. Initial 100 mL of 10 mg/L $H_2O_2$ solutions were prepared using ultrapure water. Measurements of the initial 10 mg/L solution were done in triplicate before introduction to the catalytic reactor. Once introduced, the tin foil lid was applied. Reactions were timed and $H_2O_2$ concentration levels were measured every 10 minutes using the adapted spectrophotometric triiodide method for a minimum of 3 hours to provide consistency between experiments.

When decomposition experiments were performed, rates of reactions were considered to be first-order reactions. Reactions were mass normalized for each catalyst. Since the reaction occurs at the surface of the catalyst, surface normalized rate constants were also estimated for the minerals. Since the grain shapes differed between catalysts, an assumption was made, for calculation purposes only, that all granules were of uniformly spherical shape. The mass-normalized and surface-normalized rates of $H_2O_2$ decomposition for each inorganic catalyst, and GAC, used in the Batch Reactions are provided in below Tables 4 and 5.

TABLE 4

Mass-normalized rates of reaction from the Batch Reactions

| Catalyst | Rate of reaction ((moles/L)/(s · g)) |
| --- | --- |
| GAC | $(2.1 \pm 0.6) \times 10^{-9}$ |
| Activated Alumina | $(6.9 \pm 1.3) \times 10^{-10}$ |
| $Al_2O_3$ | $(6.9 \pm 2.6) \times 10^{-10}$ |
| Fe(OH)O | $(5.6 \pm 1.1) \times 10^{-10}$ |
| $TiO_2$ | $(2.9 \pm 1.0) \times 10^{-10}$ |
| Zn | $(2.7 \pm 3.5) \times 10^{-10}$ |
| MgO | $(1.2 \pm 1.2) \times 10^{-10}$ |

TABLE 5

Surface-Normalized rates of reaction from the Batch Reactions

| Catalyst | Rate of reaction ((moles/L)/(s · g · mm²)) |
| --- | --- |
| Zn | $(2.0 \pm 2.5) \times 10^{-13}$ |
| $Al_2O_3$ | $(1.4 \pm 0.1) \times 10^{-13}$ |
| Activated Alumina | $(3.1 \pm 0.0) \times 10^{-14}$ |
| $TiO_2$ | $(9.3 \times\pm 3.0) \times 10^{-14}$ |
| Fe(OH)O | $(1.6 \pm 0.3) \times 10^{-14}$ |
| MgO | $(7.3 \pm 7.3) \times 10^{-15}$ |

*These results do not include GAC due to the porosity complicating surface area calculations The results above indicate that the rates of reactions for the inorganic catalytic materials and GAC are as follows: GAC>activated alumina>aluminum oxide>iron (III) oxide>titanium oxide>zinc>magnesium oxide.

Example 2

Rapid Small-Scale Column Testing

Rapid small-scale column testing (RSSCT) was conducted with GAC, $Al_2O_3$, and Fe(OH)O. RSSCT utilize small-scale columns that are scaled down from a large-scale column to have similar mass transfer processes. Although smaller in size, the column will have the same hydraulics with just a percent of the volume and empty bed contact time (EBCT). GAC and $Al_2O_3$ columns having the parameters described in Table 6 were prepared.

TABLE 6

Column Parameters of GAC and $Al_2O_3$ columns used for RSSCT

| | |
| --- | --- |
| Internal Diameter (mm) | 16 |
| Mean Particle Size of Catalyst (mm) | 0.34 |
| Media Depth (mm) | 67 |

The columns were hooked up to a VWR (Radnor, Pa.) mini variable flow pump for flow rates <10 mL/min and a Masterflex (Vernon Hills, Ill.) digital console drive pump for flow rates >10 mL/min. Flow rates were adjustable so that they were identical in the two columns compared side by side. The columns were fitted with identical length of tubing and fittings to allow for duplicate hydraulic conditions. Glass wool (Acros Organics, Geel, Belgium) and glass beads (Fisher Scientific, Pittsburgh, Pa.) were used at the inlets and the outlets of the columns for distribution of flow and to prevent movement of the packing material in the column.

Initial $H_2O_2$ solutions of 10 mg/L were made from 30% reagent (Sigma-Aldrich, St. Louis, Mo.) and diluted with tap water, and these solutions were used as the influent. Tap water parameters and the instrument used to measure them are listed in Table 7.

TABLE 7

Tap water quality parameters and analyzer

| | | |
| --- | --- | --- |
| Alkalinity | 34.6 mg/L as $CaCO_3$ | HACH Test Kit Cat #20637-00 |
| pH | 7.88 | HACH-H280 |
| Total Organic Carbon | 2.75 mg/L | Shimadzu TOC-LCPN |
| Total Dissolved Solids | 73.5 ppm | HACH-H280 |

Figure 6:
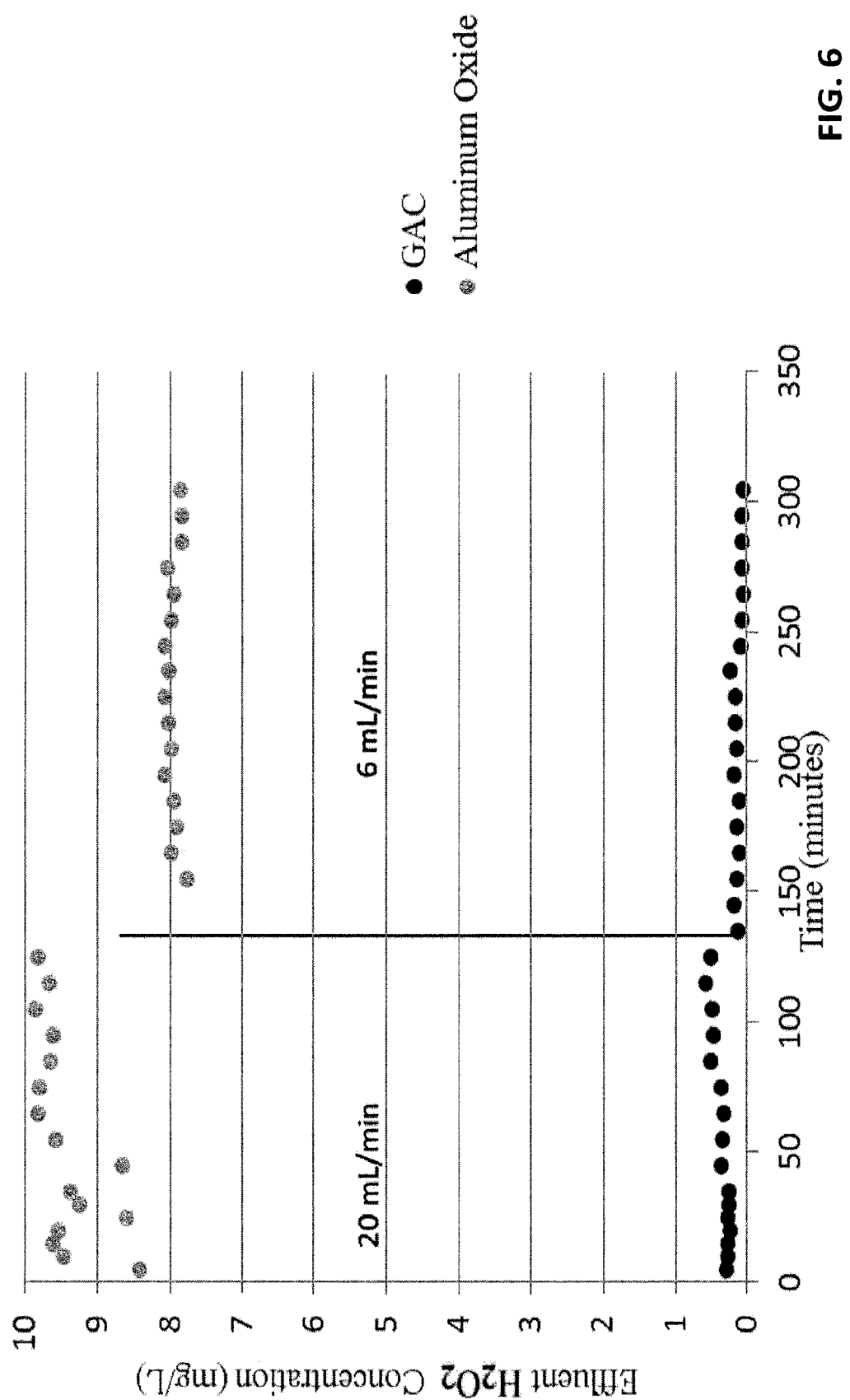
FIG. 6 is a graphical illustration comparing $H_2O_2$ removal via catalytic quenching and GAC according to some embodiments described herein.

Using these solutions as the influent, RSSCT was performed with the GAC and $Al_2O_3$ columns simultaneously. Effluent $H_2O_2$ concentrations were measured using the adapted spectrophotometric triiodide method. The first 125 minutes were performed with a flow rate of 20 mL/min giving effluent $H_2O_2$ concentrations of 0.35±0.11 mg/L for GAC and 9.42±0.46 mg/L for $Al_2O_3$. After 125 minutes flow rates were lowered to 6 mL/min. This was done when results showed that the $Al_2O_3$ was not working effectively. By lowering the flow rate, the EBCT was increased. The lowest flow rate the pump could output was 6 mL/min. This yielded an EBCT of approximately 4 minutes compared to 1.2 min at 20 mL/min flow rate and gave an effluent $H_2O_2$ concentration of a 0.11±0.05 mg/L for GAC and 7.95±0.10 mg/L for $Al_2O_3$. FIG. 6 depicts results of the simultaneous RSSCT of the GAC and $Al_2O_3$ columns having flow rates of 20 mL/min and 6 mL/min, and using a 10 mg/L $H_2O_2$ influent.

Example 3

Additional RSSCT with $Al_2O_3$

Based on the results of the simultaneous RSSCT of the GAC and $Al_2O_3$ columns in Example 2, the $Al_2O_3$ column exhibited a longer EBCT than GAC to effectively quench the $H_2O_2$. An optimal EBCT was calculated to be 20 minutes. Thus, more RSSCT was conducted where the flow rate was adjusted to achieve longer EBCTs, including an EBCT of 20 minutes.

Figure 7:
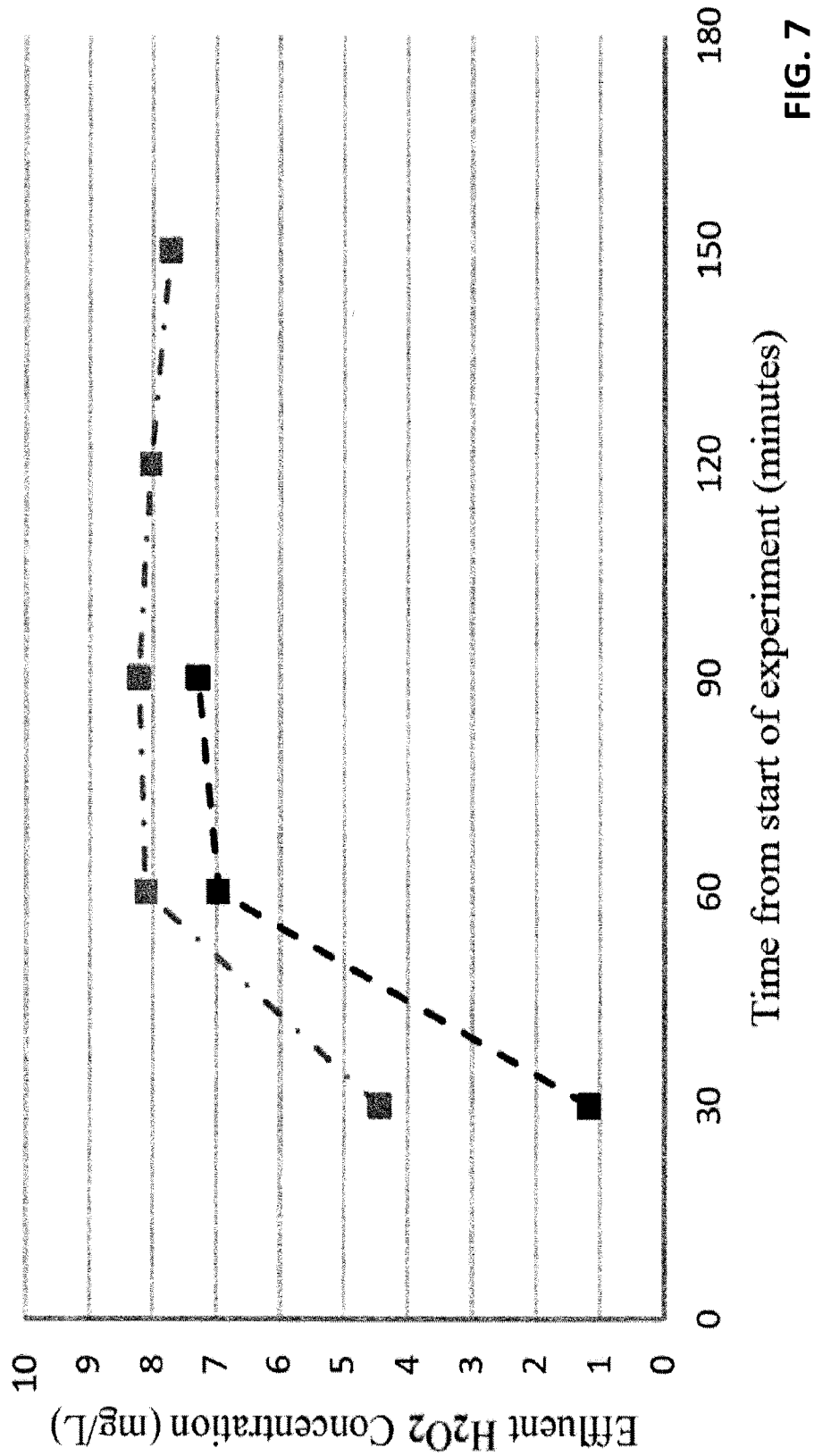
FIGS. 7-9 are graphical illustrations of results of catalytic quenching $H_2O_2$ according to some embodiments described herein.

A test, again using the influent with a 10 mg/L concentration of $H_2O_2$, was conducted using a 6 mL/min flow rate to achieve a 14 minute EBCT. During the test, initial readings showed a 1.2 mg/L effluent $H_2O_2$ reading with results sharply increasing to 7 mg/L at the 60 minute mark. In a repeat test, the initial effluent $H_2O_2$ reading was at 4.5 mg/L and sharply increased to 8 mg/L at the 60 minute mark where the next 2 hours resulted in 8.0±0.2 mg/L readings. These results are shown in FIG. 7. Results from rapid small-scale column testing of the $Al_2O_3$ column in FIG. 7 utilized a flow rate of 6 mL/min and a 10 mg/L $H_2O_2$ influent.

Figure 8:
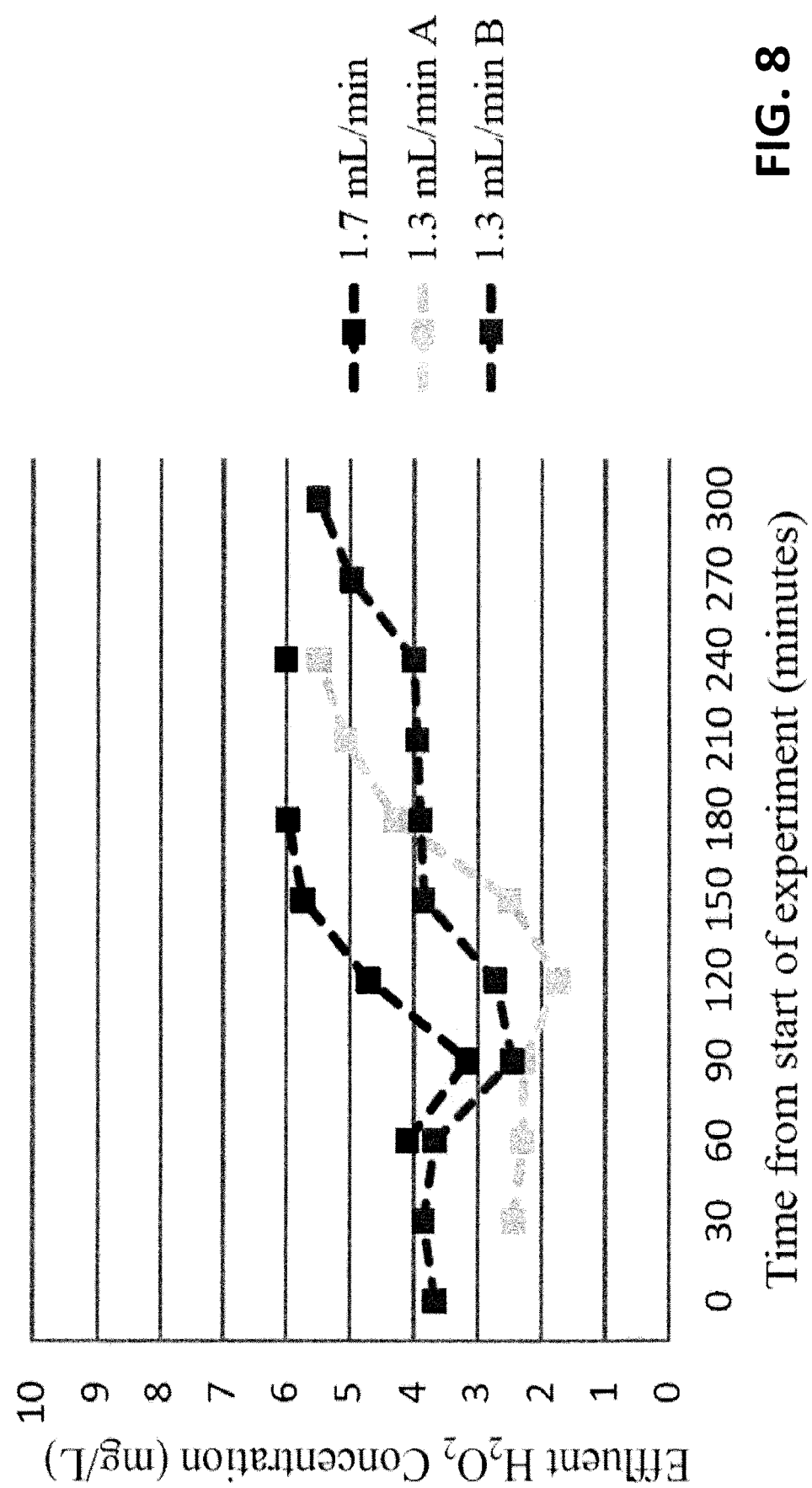

Additional tests using the influent with a 10 mg/L concentration of $H_2O_2$, were conducted at a flow rate of 1.7 mL/min, yielding a 50 minute EBCT, and at a flow rate of 1.3 mL/min, yielding a 60 minute EBCT. The test conducted using a flow rate of 1.3 mL/min was repeated, and results are shown in FIG. 8.

During the initial testing of the column at 1.3 mL/min, the effluent had a $H_2O_2$ concentration of 2.2 mg/L±0.3 mg/L during the first 2.5 hours before the concentration increased demonstrating a decrease of catalytic rate. During the repeat test, it was evident that catalytic rate slowly decreased over time and that the faster the flow rate the quicker this decrease would occur. It is hypothesized that this was due to the hygroscopic nature of aluminum oxide. It is likely that the catalyst was getting saturated with water molecules that would provide a barrier between the catalytic active sites of the surface and the $H_2O_2$ molecules in the solution preventing any quenching from occurring.

Example 4

RSSCT for Fe(OH)O

A Fe(OH)O column having the parameters set forth in Table 8 was prepared.

TABLE 8

| Column Parameters Fe(OH)O used for RSSCT | |
|---|---|
| Average Granule Size (mm) | 0.45 |
| Internal Column Diameter (mm) | 16 |
| Bed Volume (mm³) | 500 |
| Cross-Sectional Area of Column (mm²) | 20 |
| Bed Length (mm) | 25 |

Figure 9:
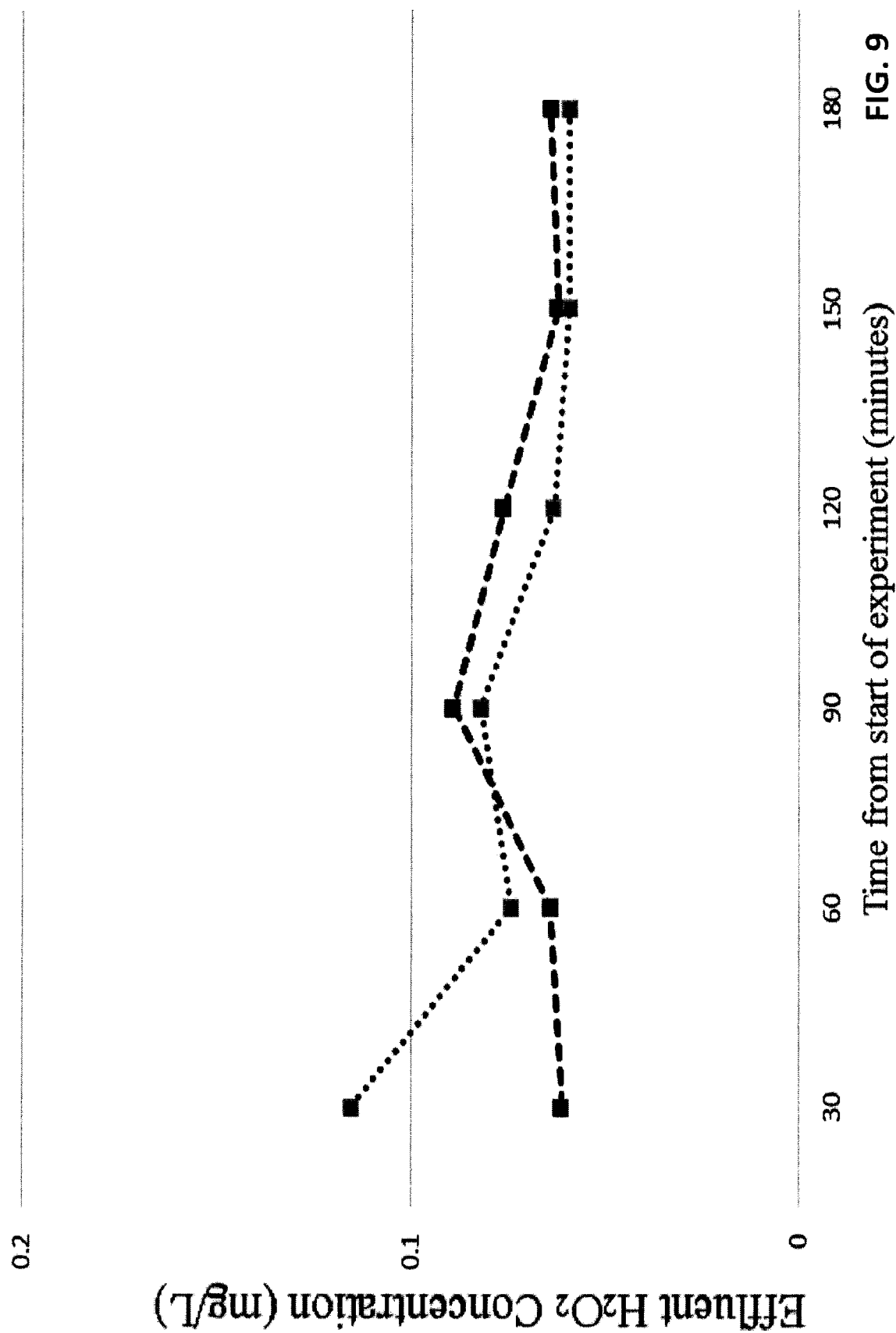

RSSCT was conducted using the influent containing 10 mg/L of $H_2O_2$ at a flow rate of 20 mL/min. Effluent $H_2O_2$ concentrations were 0.070±0.004 mg/L at the 2.5 minute EBCT and this effluent concentration was sustained for the 3 hour duration of the testing. These results are shown in FIG. 9. FIG. 9 shows that Fe(OH)O far outperformed currently used GAC, whose results are shown in FIG. 6. At the same flow rate of 20 mL/min, and the same approximate granule size, Fe(OH)O was able to achieve 98.9-99.4% efficiency in decomposition of $H_2O_2$ with a 25 mm column, while GAC was able to achieve 94.3 to 97.8% efficiency with a 67 mm column. Effluent $H_2O_2$ concentrations were about five times lower with Fe(OH)O compared to GAC.

Various embodiments of the present invention have been described in fulfillment of the various objectives of the invention. It should be recognized that these embodiments are merely illustrative of the principles of the present subject matter. Numerous modifications and adaptations thereof will be readily apparent to those skilled in the art without departing from the instant disclosure.

What is claimed is:

1. A water treatment device for heterogeneous catalytic quenching of hydrogen peroxide ($H_2O_2$) in a water source, the device comprising:
   a column comprising an inlet for receiving a water source comprising $H_2O_2$; and
   a catalytic material for $H_2O_2$ decomposition disposed in the column, the catalytic material comprising self-supported nonporous granules of Fe(III) oxide, wherein the granules form a catalytic bed, the catalytic bed having a bulk porosity from inter-granule spacing of between about 25-75%.

2. The device of claim 1, the column comprising a length of about 0.25 meter (m) or more and a diameter of about 0.1 m or more.

3. The device of claim 1, wherein the granules form a catalytic bed, the catalytic bed comprising a bulk density of between about 1-5 g/cm³.

4. The device of claim 1, wherein the granules comprise Fe(OH)O or $Fe_2O_3$.

5. The device of claim 1, wherein the granules comprise an average particle size or diameter of between about 0.1-30 mm.

6. The device of claim 1, wherein the granules are spherical.

7. The device of claim 1, wherein the granules are non-spherical.

8. The device of claim 1, wherein the granules comprise a density of between about 0.5-8 g/cm³.

9. The device of claim 1, wherein the column is configured to treat between about 10-100 L/min of water.

10. The device of claim 1, wherein the column has an operable service life of at least about 1,000 hours at a $H_2O_2$ removal efficiency of at least 90 percent without cleaning of the column.

11. The device of claim 1 having an $H_2O_2$ removal efficiency of at least 95 percent.

12. A water treatment system for heterogeneous catalytic quenching of hydrogen peroxide ($H_2O_2$) in a water source, the system comprising:
- the water source;
- a catalytic reactor comprising an inlet and an outlet for passing the water source; and
- at least one bed of catalytic material disposed in the catalytic reactor between the inlet and the outlet, the bed of catalytic material comprising self-supported nonporous granules of Fe(III) oxide, the catalytic bed having a bulk porosity from inter-granule spacing of between about 25-75%, and a bulk density of about 1-5 g/cm$^3$;
- wherein the water source comprises an influent $H_2O_2$ concentration at the inlet and an effluent $H_2O_2$ concentration at the outlet, the effluent $H_2O_2$ concentration being at least about 90% less than the influent $H_2O_2$ concentration.

13. The system of claim 12, wherein the effluent $H_2O_2$ concentration is at least about 95% less than the influent $H_2O_2$ concentration.

14. The system of claim 12, wherein the bed of catalytic material comprises a length of about 0.25 meter (m) or more and a diameter of about 0.1 m or more.

15. The system of claim 12, wherein the granules comprise Fe(OH)O or $Fe_2O_3$.

16. The system of claim 12, wherein the granules are non-spherical and comprise an average particle size or diameter between about 0.1-30 mm.

17. The system of claim 12, wherein the catalytic reactor is configured to treat between about 10-100 L/min of water.

18. The system of claim 12, wherein the catalytic reactor is operable for 1,000-10,000 hours.

19. The system of claim 12 further comprising an advanced oxidation process (AOP) reactor in communication with the inlet of the catalytic reactor.

20. The system of claim 12 further comprising a disinfecting unit in communication with the outlet of the catalytic reactor.

21. A method for heterogeneous catalytic quenching of hydrogen peroxide ($H_2O_2$) in a water source, the method comprising:
- providing a catalytic reactor;
- fixing at least one bed of catalytic material in the catalytic reactor, the bed of catalytic material comprising self-supported nonporous granules of Fe(III) oxide, the catalytic bed having a bulk porosity from interparticle spacing of between about 25-75%;
- flowing the water source through the catalytic reactor, the water source comprising an influent $H_2O_2$ concentration; and
- removing at least 90% of the influent $H_2O_2$ concentration from the water source.

22. The method of claim 21, wherein the granules comprise Fe(OH)O or $Fe_2O_3$.

23. The method of claim 21, wherein fixing at least one bed of catalytic material comprises fixing a bed having a length of about 0.25 meter (m) or more and a diameter of about 0.1 m or more.

24. The method of claim 21, wherein flowing the water source through the reactor comprises flowing the water source through the reactor at a rate of about 10-100 L/min.

25. The method of claim 21, wherein flowing the water source through the reactor comprises flowing the water source through the reactor for between about 1-5 minutes.

26. The method of claim 21, wherein removing at least 90% of the influent $H_2O_2$ concentration from the water source occurs on-contact with the bed of catalytic material.

* * * * *